US 9,165,064 B2

(12) United States Patent
Brown

(10) Patent No.: US 9,165,064 B2
(45) Date of Patent: *Oct. 20, 2015

(54) CONTEXT-AWARE PROMPTS AND ALERTS IN A NOTE-SHARING SYSTEM

(75) Inventor: Stephen J. Brown, Woodside, CA (US)

(73) Assignee: Apple Inc., Cupertino, CA (US)

( * ) Notice: Subject to any disclaimer, the term of this patent is extended or adjusted under 35 U.S.C. 154(b) by 496 days.

This patent is subject to a terminal disclaimer.

(21) Appl. No.: 12/924,094

(22) Filed: Sep. 20, 2010

(65) Prior Publication Data

US 2011/0153744 A1 Jun. 23, 2011

Related U.S. Application Data

(63) Continuation-in-part of application No. 12/322,046, filed on Jan. 27, 2009, now Pat. No. 8,200,757, and a continuation-in-part of application No. 12/381,594, filed on Mar. 13, 2009, now Pat. No. 8,096,477, and a continuation-in-part of application No. 12/802,740, filed on Jun. 11, 2010.

(60) Provisional application No. 61/276,975, filed on Sep. 18, 2009.

(51) Int. Cl.
*G06F 7/00* (2006.01)
*G06F 17/30* (2006.01)
*G06F 17/24* (2006.01)

(52) U.S. Cl.
CPC ........ *G06F 17/30731* (2013.01); *G06F 17/241* (2013.01); *G06F 17/30557* (2013.01)

(58) Field of Classification Search
USPC ............................ 707/608, 736, 803; 705/344
See application file for complete search history.

(56) References Cited

U.S. PATENT DOCUMENTS

| 8,275,767 | B2 * | 9/2012 | Shepherd et al. ............. 707/728 |
| 8,370,062 | B1 * | 2/2013 | Starenky et al. ............. 701/467 |
| 2002/0120506 | A1 * | 8/2002 | Hagen .............................. 705/14 |
| 2005/0076098 | A1 * | 4/2005 | Matsubara et al. ........... 709/219 |
| 2006/0206564 | A1 | 9/2006 | Burns et al. |
| 2007/0118802 | A1 | 5/2007 | Gerace et al. |
| 2007/0298399 | A1 | 12/2007 | Shao et al. |
| 2008/0021976 | A1 | 1/2008 | Chen et al. |
| 2008/0034056 | A1 | 2/2008 | Renger et al. |
| 2008/0056574 | A1 | 3/2008 | Heck |
| 2008/0082548 | A1 * | 4/2008 | Betts .............................. 707/10 |
| 2008/0114829 | A1 * | 5/2008 | Button et al. ................. 709/203 |

(Continued)

OTHER PUBLICATIONS

"Facebook plans to add 'place' feature" by John D. Sutter, CNN. Mar. 26, 2010.*

(Continued)

*Primary Examiner* — Uyen Le
(74) *Attorney, Agent, or Firm* — Novak Druce Connolly Bove + Quigg LLP

(57) ABSTRACT

A semantic note taking system and method for collecting information, enriching the information, and binding the information to services is provided. User-created notes are enriched with labels, context traits, and relevant data to minimize friction in the note-taking process. Context aware prompts and alerts are generated and send to users associated with the note. Users associated with the note could respond to the alerts and prompt by adding or further enriching the note with contextual traits. The prompts, alerts and responses could be shared among the group of users associated with the note.

10 Claims, 16 Drawing Sheets

(56) References Cited

U.S. PATENT DOCUMENTS

| | | | |
|---|---|---|---|
| 2008/0133488 A1* | 6/2008 | Bandaru et al. | 707/3 |
| 2009/0132941 A1* | 5/2009 | Pilskalns et al. | 715/764 |
| 2009/0276709 A1* | 11/2009 | Venneman et al. | 715/716 |
| 2010/0005135 A1* | 1/2010 | Yang | 709/203 |

OTHER PUBLICATIONS

Takashi Yoshino et al, "NAMBA: Location-Aware Collaboration System for Shopping and Meeting", IEEE Transactions on Consumer Electronics, vol. 3, Aug. 2002, pp. 470-477.*

* cited by examiner

CONTEXT-AWARE PROMPTS AND ALERTS IN A NOTE-SHARING SYSTEM

CROSS-REFERENCE TO RELATED APPLICATIONS

This application claims priority from U.S. Provisional Patent Application 61/276,975 filed Sep. 18, 2009, which is incorporated herein by reference. This application is a continuation-in-part of U.S. patent application Ser. Nos. 12/322,046 filed Jan. 27, 2009 now U.S. Pat. No. 8200757, 12/381,594 filed Mar. 13, 2009 now U.S. Pat. No. 8096477, and 12/802,740 filed Jun. 11, 2010, which are all incorporated herein by reference.

FIELD OF THE INVENTION

The invention relates generally to online social media. More particularly, the invention relates to methods and systems of context-aware prompts and alerts in a note-sharing system.

BACKGROUND

Today, a tremendous number of online services and applications are available. The existing online services are related to virtually every aspect of life, including work, relationships, health, entertainment, news, etc. Access to these online services typically only requires an Internet connection. However, the abundance of services also causes information overload. As a result, disorganized information is floating around many users' lives and brains. Instead of positively influencing our lives, the services become cumbersome and are often neglected. In particular, the advent of social media has made it easier to share information with more people and make connections with people who we otherwise would not. However, the ubiquity of social media (such as through social networks) has created a further explosion in the information content of our lives and relationships. This information clutter reduces a user's productivity and shortens the user's attention span.

Typically, ideas begin with private thoughts that are later refined and shared to friends and, perhaps, the public at large. Who these ideas are to be shared with often evolve over time. Existing online services are not amenable to this process of developing ideas and deciding where to share them at a later time. For example, existing social media forces ideas immediately into the public domain. Information or media posted on social networks (e.g. Facebook.com, Twitter.com, and Flickr.com) or blogs (e.g. Wordpress.com and Blogger.com) are immediately accessible by other users. To post information in existing social media requires upfront cognitive decision-making related to the audience level of the information at the time the information was collected or generated. This process does not match the way human brains function.

Systems, such as emailing to oneself and note-taking applications (e.g. Evernote.com) exist for users to store private thoughts. However, these existing systems are not integrated with other services or applications. In other words, a user would have to access and sign on to multiple applications simultaneously to utilize information stored in the application storing the private thoughts. Because of the lack of integration and inconvenience of these systems, they are seldom used, therefore, ideas are often forgotten. In addition, existing note-taking applications require users to provide all of the information content to the note. By forcing a user to provide all of the information content, the note-taking process is typically tedious, error-prone, and incomplete.

The invention addresses at least the above-described difficult problems and advances the art with a semantic note taking and enriching system and method. Furthermore, the invention advances the art with context-aware prompts and alerts in the note-sharing system.

SUMMARY OF THE INVENTION

Embodiments of the invention are directed to a semantic note taking system and method for collecting information, enriching the information, and binding the information to services. A plurality of users are communicatively connected to an application server to create one or more notes that can be bound to one or more of a plurality of services and stored in a database. The application server operates a plurality of functions, including a note taking function for allowing each of the users to create one or more notes, a categorizing function for labeling each of the notes with one or more changeable categories, a context function for associating one or more context traits with each of the notes, a binding function to establish one or more changeable binding rules for each of the notes, wherein the binding rules determine one or more of the services where the note is to be bound, and wherein the binding rules are related to the content of the note, the categories of the note, the context traits of the note, a user binding selection, or any combination thereof, and a communication function for communicating each of the notes to one or more of the services where the note is to be bound.

A note includes text, audio media, visual media, audio-visual media, recorded data, a weblink, a pointer to an information source, or any combination thereof. In an embodiment, one or more of the context traits associated with the note includes a time, a location, physical data relating to the user device used to generate the note, or any combination thereof. In another embodiment, relevant data is derived based on one or more of the context traits and the relevant data is attached to the note. The relevant data can be derived by matching one or more of the context traits with data from an information module such as a calendar, an address book, a contact list, a user profile, a user history, or any combination thereof. In an embodiment, one or more of the context traits associated with the note is based on one or more categories of the note, the content of the note, a user history, or any combination thereof.

In a preferred embodiment, the binding rules include one or more publication properties, such as an audience level for the note and/or one or more locations to publish the note. The locations to publish the note can include a private domain of the user, one or more friends of the user, one or more computer-implemented social networks, a blog, an online discussion board, a website, or any combination thereof. In an embodiment, the binding rules are automatically determined based at least partially on one or more of the categories, one or more context traits, the note content, a user history, or any combination thereof.

The application server of an embodiment of the invention operates a suggestion function for suggesting one or more services, binding rules, and/or categories. The suggestions can be based at least partially on one or more the categories, one or more of the context traits, the note content, a user history, one or more binding rules, or any combination thereof. In an embodiment, a note is automatically bound to one of the suggested services. Preferably, the suggestion function uses a user history of selections of services and/or categories.

In an embodiment of the invention, a user interface is provided to allow user entry of the categories and binding rules for a note, wherein the user interface includes a first symbol associated with the categories of the note and a second symbol associated with the binding rules of the note. Preferably, the user entry of the first symbol triggers a display of one or more of the categories suggested to the user and selectable by the user. Similarly, the user entry of the second symbol triggers a display of one or more of the binding rules suggested to the user and selectable by the user. In another embodiment, a user interface corresponding to each of the services where a note can be bound is provided. Each of the service-specific user interfaces includes one or more buttons for initiating an action for the service corresponding to the user interface. Preferably, a single click of one of the buttons initiates creation of the note, automatic addition of content to the note, automatic labeling of the note with categories, and communication of the note to the service corresponding to the user interface.

In an embodiment, the user device operated by users to access the application server is a mobile device that communicates with the application server over a wireless network. The services where a note can be bound are selected from the group consisting of a website, a web application, a computer-implemented social network, a blog, a review website, a product review website, an entertainment website, a health application, a medical application, an online retailer, an email application, a research application, a clinical application, a calendar, and an address book.

In an embodiment, a note taking function is provided to allow a user to create a note on a user device, wherein said created note is stored. One or more contextual traits are associated with the note. A search and binding function is further provided for executing computer or network search queries for one or more rules that associate one or more contextual traits with the note, and binding the result of the found rule to the stored note. Depending on the found results for rules another computer or network search can be executed in an iterative fashion for data that links one or more contextual traits with the note. The iteration ends when linked data is found, and the found linked data is bound to the stored note.

In an embodiment, the note taking system is used as a platform to provide context aware prompts and alerts. A plurality of users are communicatively connected to an application server to create one or more notes. The application server provides a plurality of services. A note taking function is provided for allowing each of the users to create one or more notes. Each note could be associated with one or more contextual traits with the use of a context or enriching function. A prompt or alert assigning function could be used to assign prompts or alerts to a note. Users could register to prompts or alerts using a registering function assigned to a note. The registration process could include a defining function to define one or more contextual traits for receiving prompt or alert (e.g. location). A receiving function is provided to receive prompts or alerts based on the defined and registered contextual traits. In one example, one of the users is a professional service provider taking notes and defining a prompt and alert system to people associated with that note. Users associated with the note could respond to the alerts and prompt by adding or further enriching the note with one or more contextual traits. The prompts, alerts and responses could be shared among the group of users associated with the note using a sharing function.

BRIEF DESCRIPTION OF THE FIGURES

The invention together with its objectives and advantages will be understood by reading the following description in conjunction with the drawings, in which.

DETAILED DESCRIPTION OF THE INVENTION

The abundance of online services provides users with opportunities to perform many tasks and connect with numerous people from nearly any location. However, the large number of services often cause information overload and a user cannot efficiently organize the explosion of information content concerning the user's life, work, and relationships. An embodiment of the invention is directed to a semantic note taking system and method to collect, enrich, and bind information to services. Semantic note taking allows users to effortless offload information from private thought streams for later determination of where to bind these thoughts. In addition, semantic note taking minimizes the friction to record and share ideas by automatically enriching the note and reducing unnecessary user input. In other words, the invention is directed to a system and method to collect unscripted data, add more meaning and use out of the data, and bind the data to services.

Figure 1:
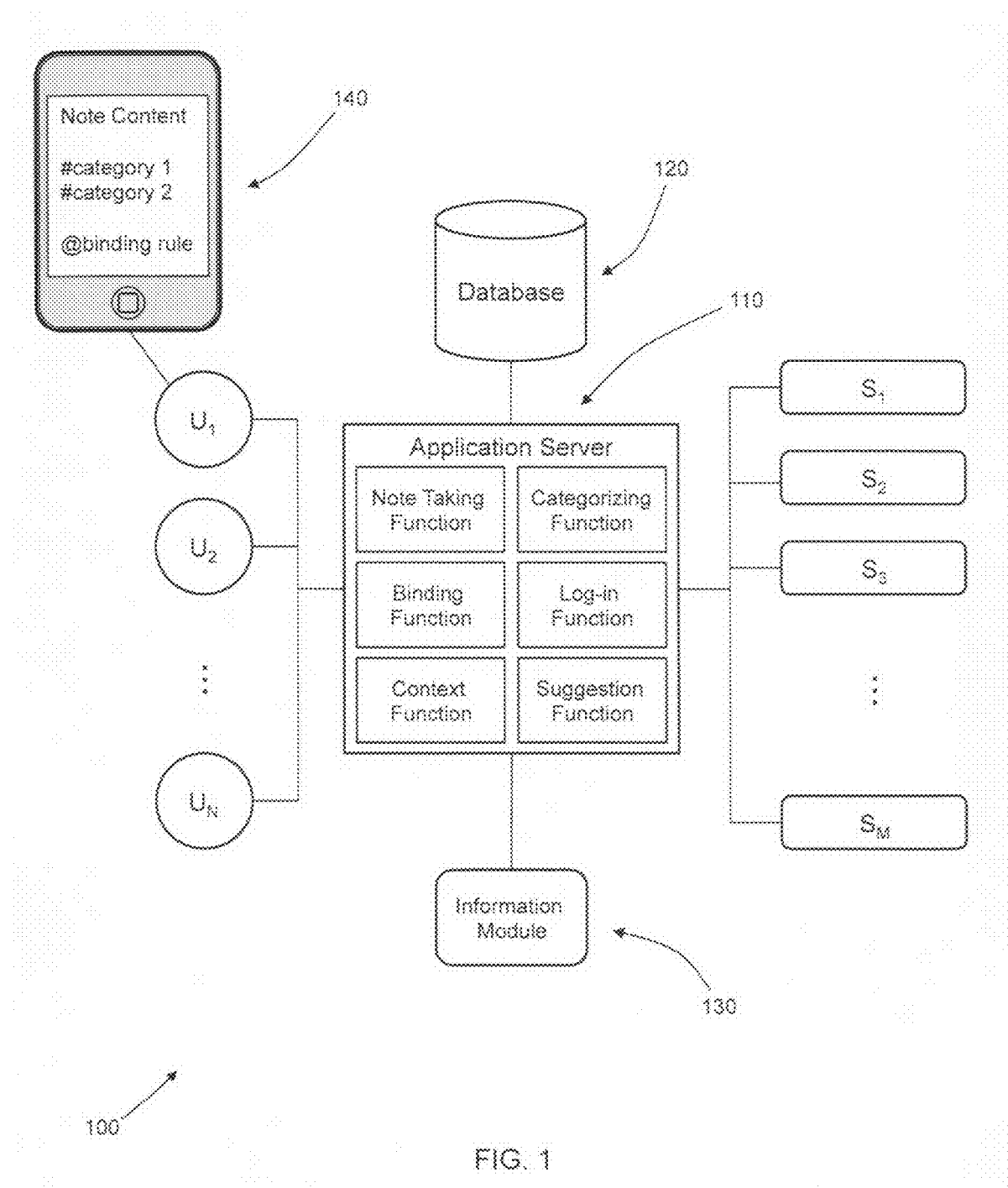
FIG. 1 shows an example of a semantic note taking system according to an embodiment of the invention.

FIG. 1 shows a preferred embodiment of a semantic note taking system 100 according to an embodiment of the invention. The semantic note taking system 100 includes an application server 110 that is accessible by a plurality of users $U_1$-$U_N$ for creating one or more notes, categorizing the notes, and binding the notes to one or more services $S_1$-$S_M$. The users $U_1$-$U_N$ connect to the application server 110 through any device capable of being communicatively connected to a network, such as the Internet. The user devices can include a computer, a laptop, a personal digital assistant (PDA), a cell phone, a mobile device, or a smart phone.

FIG. 1 shows user $U_1$ with a mobile phone 140 that is connected to the application server 110, such as through a wireless network.

A note taking function, operated by the application server 110, allows each of the users $U_1$-$U_N$ to create one or more notes. Notes can include text, audio media, visual media, audio-visual media, recorded data, a weblink, a pointer to an information source (e.g. a bookmark), or any other type of data. Notes created by the users $U_1$-$U_N$ are transmitted from the user devices to the application server 110 and stored in the database 120 for later binding to one or more of the services $S_1$-$S_M$.

The application server 110 also operates a categorizing function to label the notes with one or more categories. In an embodiment, the categorizing function allows users $U_1$-$U_N$ to label the notes, though automatic or suggested note labeling is also possible. It is noted that one or more of the categories of each note is changeable. Labeling a note with categories enriches the note. The note is further enriched by the context function operated by the application server 110, which associates one or more context traits with the note. Context traits associated with a note can be based on one or more of the categories of the note, the content of the note, a user history, or any combination thereof. Examples of context traits include a time, a location, and physical data relating to the user device. For example, the mobile phone 140 of user $U_1$ is capable of measuring the location where the note was created (e.g. by using GPS measurements) and this location can be automatically associated with the note without user input, thereby enriching the note.

Context information is not restricted to a time-stamp or location-stamp associated with the note. In a preferred embodiment of the invention, relevant data is derived based on one or more of the context traits. Relevant data can be derived by matching one or more of the context traits with data from an information module 130, such as a calendar, an address book, a contact list, a user profile, a user history, or any combination thereof. For example, a time context trait when the note is created is matched with a meeting time indicated by a calendar information module. Because the calendar includes relevant data, e.g. the participants of the meeting and the discussion topics of the meeting, this relevant data can be attached to the note to further enrich the note.

A binding function is provided to establish one or more binding rules for a note. The binding rules determine one or more services $S_1$-$S_M$ or applications where the note is to be bound. The binding rules are related to the content of the note, the categories of the note, the context traits of the note, a user binding selection, or any combination thereof. In an embodiment, the binding rules of a note are automatically determined based at least partially on one or more categories of the note, one or more context traits, the content of the note, the user history, or any combination thereof.

The services $S_1$-$S_M$ where a note can be bound can include a website, a web application, a computer-implemented social network, a blog, a review website, a product review website, an entertainment website, a health application, a medical application, an online retailer, an email application, a research application, a clinical application, a calendar, an address book, or any combination thereof. A note that is bound to a service is communicated to the service. What is done with the note after it is communicated depends on the particular functions of the service and the content of the note. For example, a note bound to a blog could be published on the blog and a note bound to a research application can include data for analysis by the research application. In addition to communicating a note to a service, in an embodiment of the invention, data can be extracted from the service where the note is bound and the extracted data is added to the note.

The services $S_1$-$S_M$ shown in FIG. 1 are generally not integrated and some of the services $S_1$-$S_M$ where a note can be bound may also require user login or authentication. To facilitate the integration of the services and allow access to the services, in an embodiment, the application server 110 includes a login function to provide login information for access to the services. Integration of the services enables a user to collect or create information content and offload the content to a single location, instead of having to interact with a myriad of different services separately.

Figure 2:
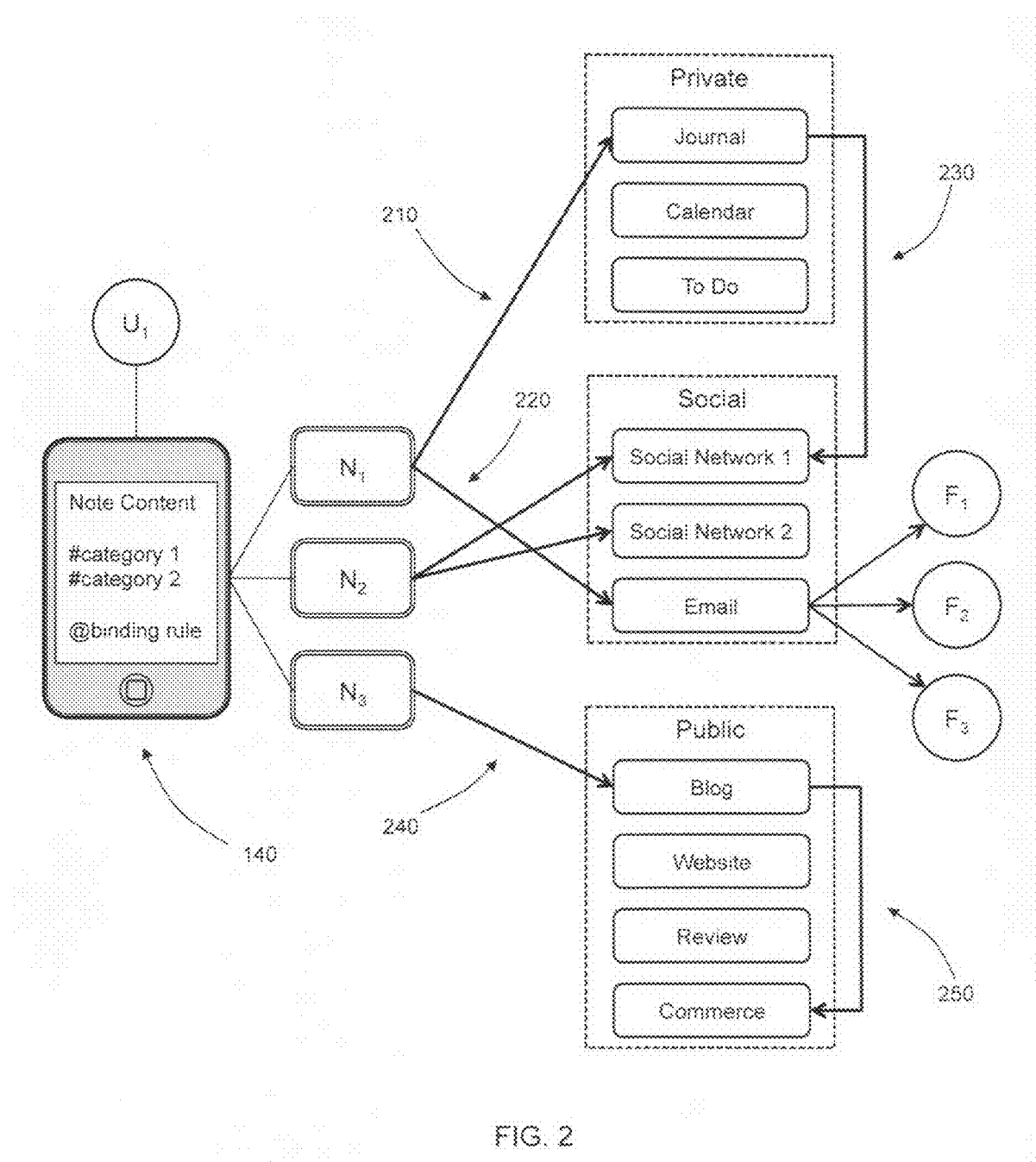
FIG. 2 shows an example of mutable binding of notes to multiple services according to an embodiment of the invention

In a preferred embodiment of the invention, the binding rules comprise one or more publication properties. The publication properties include an audience or privacy level for the note and the location to publish the note. FIG. 2 shows three notes $N_1$, $N_2$, and $N_3$ created by user $U_1$ and the binding of these notes to different services. The audience levels generally include private, social, and public designations. The locations to publish the note includes a private domain of the user, one or more friends $F_1$-$F_3$ of the user, one or more computer-implemented social networks, a blog, an online discussion board, a website, or any combination thereof. FIG. 2 shows note $N_1$ bound 210 to a private journal and bound 220 to an email application. In other words, the binding rules for note $N_1$ indicate that the note should be communicated to the journal service and the email application with the appropriate audience levels.

A note can be bound to any number of services at any time. Importantly, the binding of the note is changeable. In other words, a user can change the binding rules to alter the location where a note is to be bound. In FIG. 2, note $N_1$ is originally bound 210 to a journal but is later bound 230 to Social Network 1. Similarly, note $N_3$ is originally bound 240 to a blog, but is later bound 250 to an electronic commerce website. The mutable binding rules and late-binding method according to an embodiment of the invention is in accord with how ideas are typically generated in our brains. In particular, ideas and information typically start as private thoughts that are later shared and discussed with people we know. Finally, the information is published to the world. This is in contrast to existing social media where generated media are forced immediately into the public realm.

FIG. 2 also shows note $N_1$ published and communicated to associates or friends $F_1$-$F_3$ of user $U_1$. By publishing note $N_1$ to friends $F_1$-$F_3$, an ad hoc community or an ad hoc social network is developed around note $N_1$. In an embodiment, one or more of the friends $F_1$-$F_3$ can change the note $N_1$. In particular, data can be extracted from one of the friends $F_1$-$F_3$ and the extracted data is added to the note $N_1$.

Figure 3:
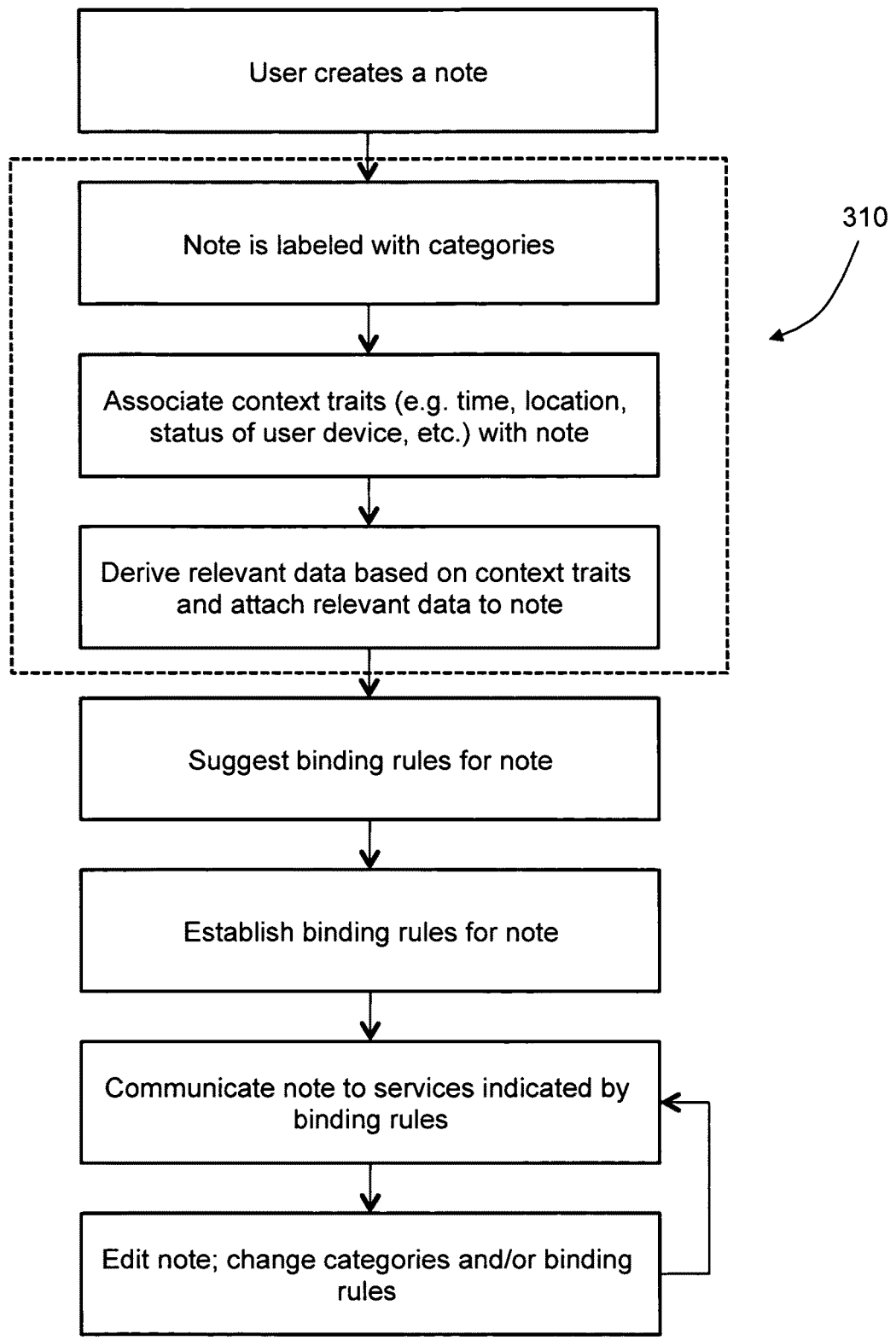
FIG. 3 shows a flow chart of an example note creation, enrichment, and binding according to an embodiment of the invention.
Figure 4:
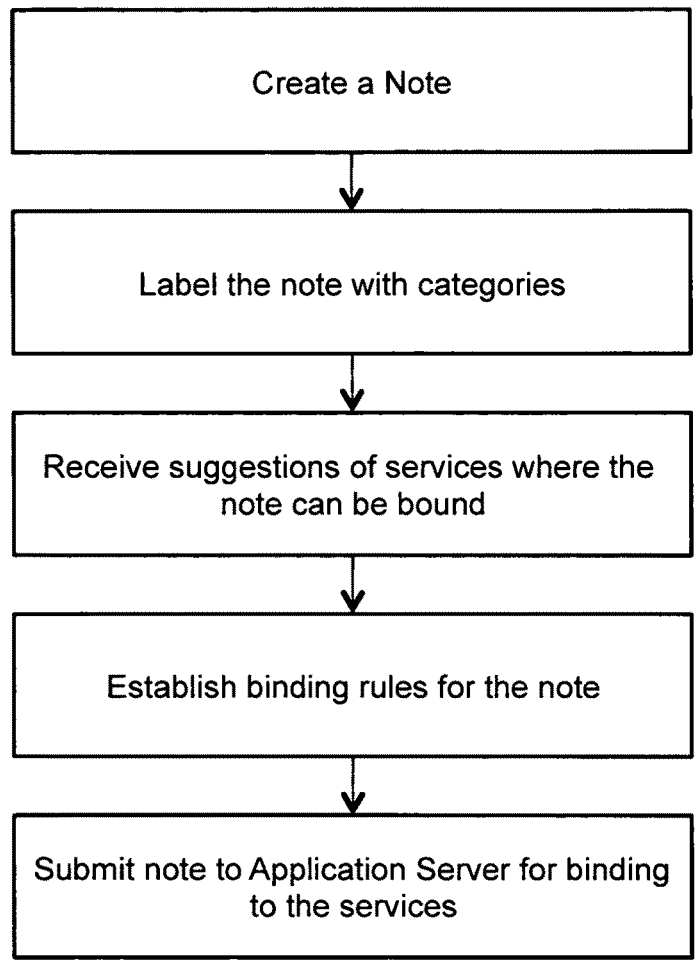
FIG. 4 shows a flow chart of example steps taken by a user according to an embodiment of the invention.

FIGS. 3 and 4 show flow charts for exemplary methods of creating, enriching, and binding the notes according to an embodiment of the invention. The steps circled with a dashed line 310 in FIG. 3 show the enrichment of the notes by labeling the note with categories, associating context traits with the note, and deriving relevant data based on the context traits. FIG. 4 shows the steps undertaken by a user of the semantic note taking system.

Figure 5:
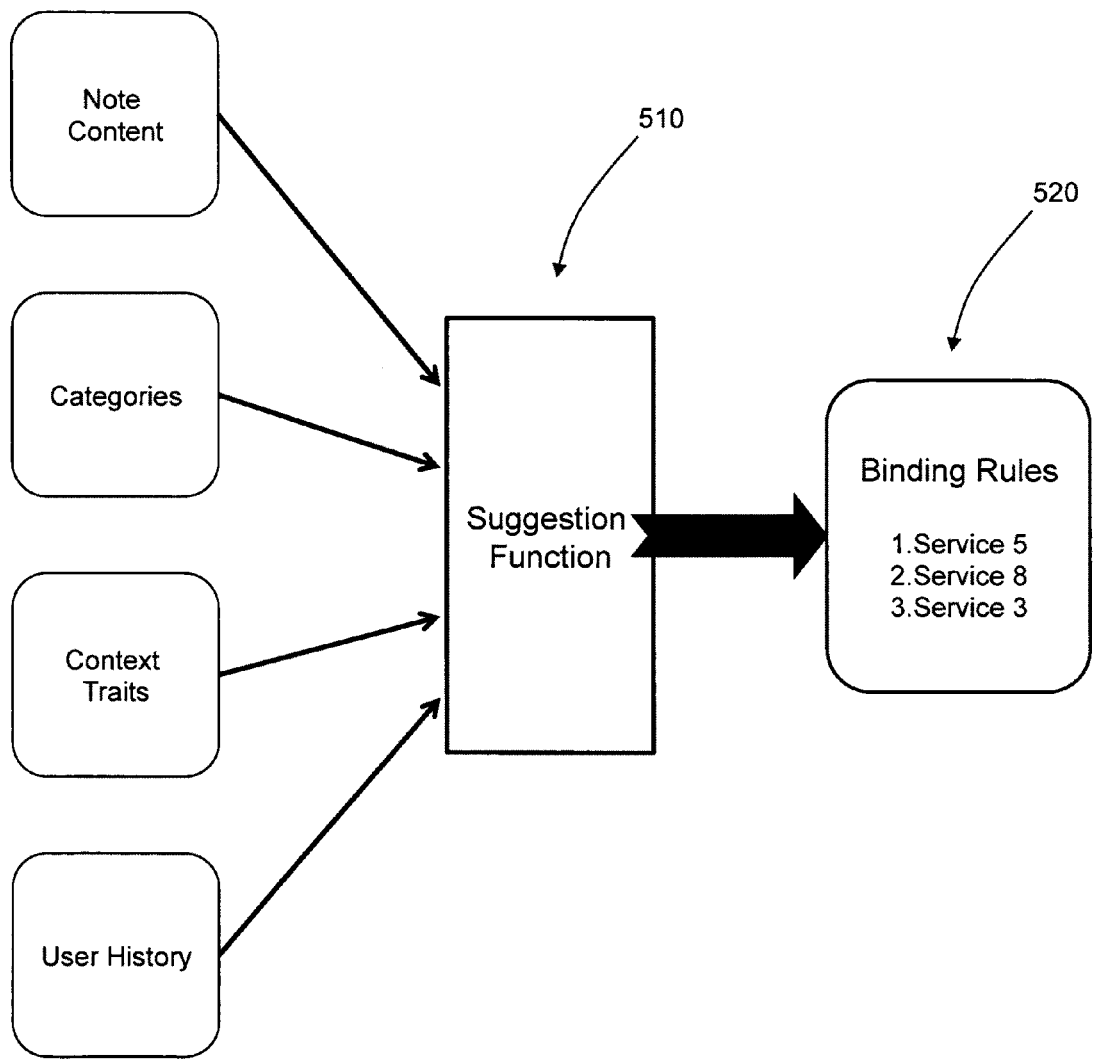
FIG. 5 shows an example of a suggestion function according to an embodiment of the invention.

FIGS. 3 and 4 also include the steps of suggesting binding rules and receiving suggestions, respectively. The application server operates a suggestion function for suggesting one or more services where the note can be bound to the user who created the note. FIG. 5 shows the inputs for the suggestion function 510, which can include the content of the note, the categories of the note, the context traits, and/or the user history. Based on these inputs, the suggestion function 510 suggests binding rules 520, such as a list of suggested services where the note can be bound. For example, FIG. 5 shows a ranked list of services with "Service 5" being the top-ranked service where the note can be bound.

In an embodiment, the suggested services or binding rules are selectable by the user, where the user selection binds the note to the selected service. User selections can be stored for reference by the suggestion function. For example, a first note is created by a user, labeled with "Category 4", and bound to "Service 5" by user selection. Because of this user selection, "Service 5" would be suggested for a second note also labeled with "Category 4". It is noted that the first and second notes can be created by the same user, or they can be created by different users. In other words, the suggestion function 510 can rely on the user history of the same user or the user history of a community of users. It is noted that the association of a service to a category is mutable and evolvable depending on user behavior. For example, though "Category 4" and "Service 5" are associated in the above example, the association of services for "Category 4" could change to "Service 3" if users frequently alter the selection from "Service 5" to "Service 3" for notes having a label of "Category 4".

In an embodiment, a note is automatically bound to one of the suggested services without user selection. In a preferred embodiment, the storage of past user selections enables intelligent and automatic binding of notes to services. Automatic binding of notes to services reduces the need for user input.

The suggestion function 510 is also capable of suggesting categories to label a note in addition to or replacement of suggesting binding rules. Suggestions of categories can be analogous to the suggestions of services described in the previous paragraphs. In particular, suggestions of categories can be based on the content of the note, the context traits of the note, other categories of the note, a user history, the binding rules established for the note, the services determined by the binding rules, or any combination thereof. For example, a note contains a description of a product. Based on this note content, a category named "product" is suggested to the user for labeling the note. In another example, the association of a service and a category based on a user history can be used to suggest one or more categories for notes having binding rules with that particular service. In an embodiment, a note is automatically labeled with one or more suggested categories.

Figure 6:
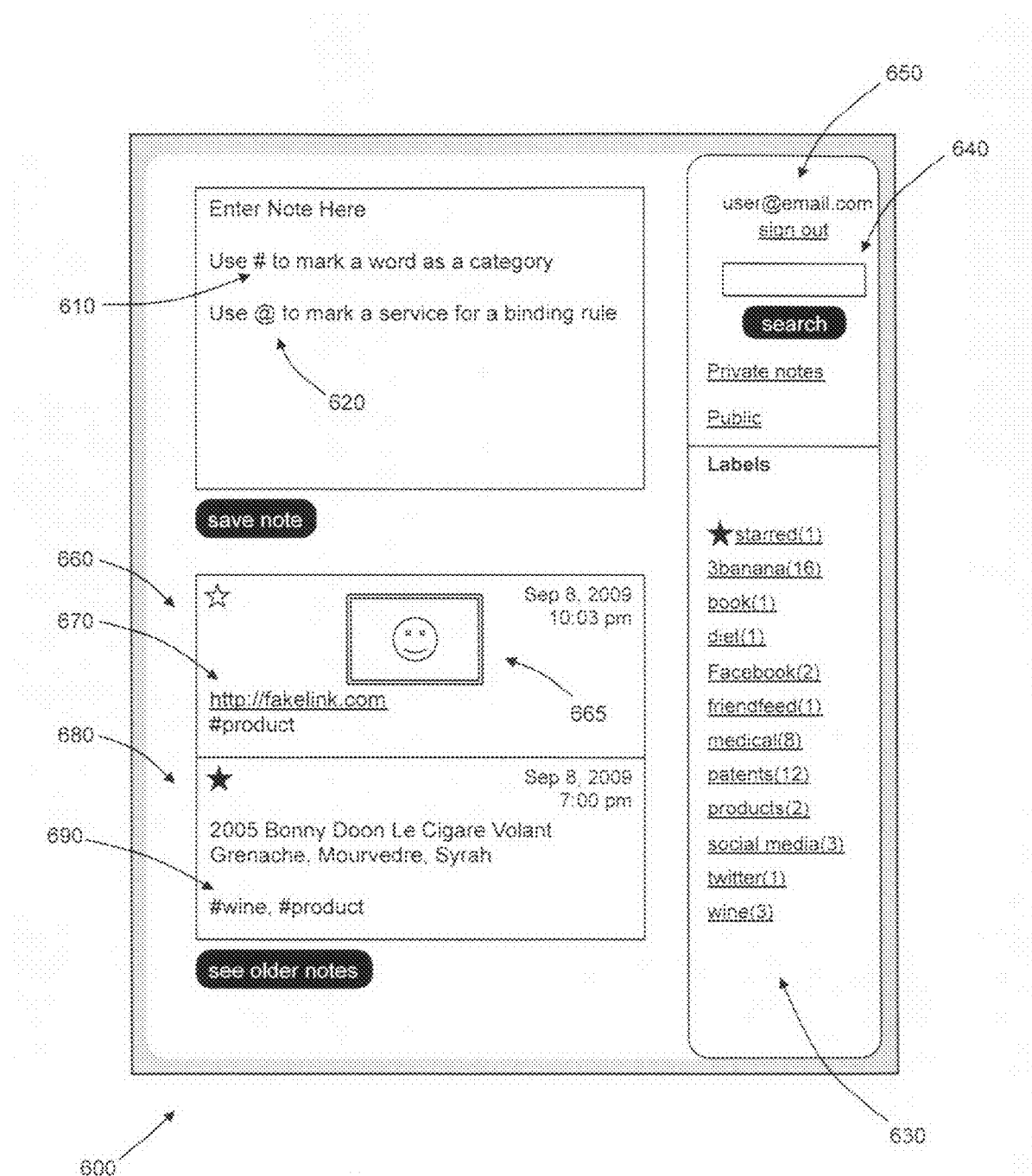
FIG. 6 shows an example user interface for semantic note taking according to an embodiment of the invention.

FIG. 6 shows an example user interface 600 for user creation of a note and user entry of categories and binding rules for the note. In an embodiment, the user interface 600 is accessible via a web browser. However, alternative methods of accessing user interfaces known in the art may also be used. In a preferred embodiment, the user interface 600 allows user entry of a first symbol 610 to designate entry of a category and a second symbol 620 to designate entry of a binding rule. As shown in FIG. 6, the first symbol 610 is the "#" sign and categorization is accomplished by placing a "#" symbol adjacent to a word. Similarly, the second symbol 620 is the "@" sign to mark a service for a binding rule. The first 610 and second 620 symbols allow easy entry of categories and binding rules. As can be appreciated by one or ordinary skill in the art, the invention is not limited to the use of symbols for categorization and binding rules.

In a preferred embodiment, entry of the first symbol 610 triggers a list of previously used categories to be displayed to the user. In particular, the list can be filtered to only include categories that may be relevant to the note, such as based on the content of the note or the context traits of the note. In an embodiment, users can override suggestions and label the note with non-suggested category or a new category. Similarly, entry of the second symbol 620 triggers a list of services or binding rules to be displayed to the user. In a preferred embodiment, user selection of a category to label the note triggers a display of suggested services where the note can be bound. Conversely, user selection of a binding rule triggers a display of suggested categories to label the note. The suggestions can be based on previously stored user selections, i.e. a user history, or any other bases as described herein with respect to the suggestion function.

The user interface 600 also includes a list of categories 630 used in all stored notes. A user can select a category from the list 630 to view notes labeled with the selected category. In an embodiment, a search box 640 is also available to find previously saved notes. FIG. 6 also shows previously saved notes 660 and 680. The note 660 includes a photo 665 and a weblink 670. The note 680 includes text description of a wine and is labeled 690 with the categories "wine" and "product" by use of the first symbol. The user interface 600 also includes a user name 650, such as the user's email address. In an embodiment, the application server requires a user authentication to access the semantic note taking system.

Embodiments of the invention are also directed to user interfaces corresponding to services to facilitate simple collection of data and binding to services. In an embodiment, a user interface is provided for each of the services where a note can be bound. The user interface corresponding to a particular service includes one or more buttons for initiating an action specific to that service. Service specific user interfaces are referred to as semantic skins. In a preferred embodiment, a single click of a button on a semantic skin initiates the creation of a note, automatic content generation and addition to the note, automatic labeling of the note with one or more categories appropriate to the service, and communication of the note to the service.

Figure 7A:
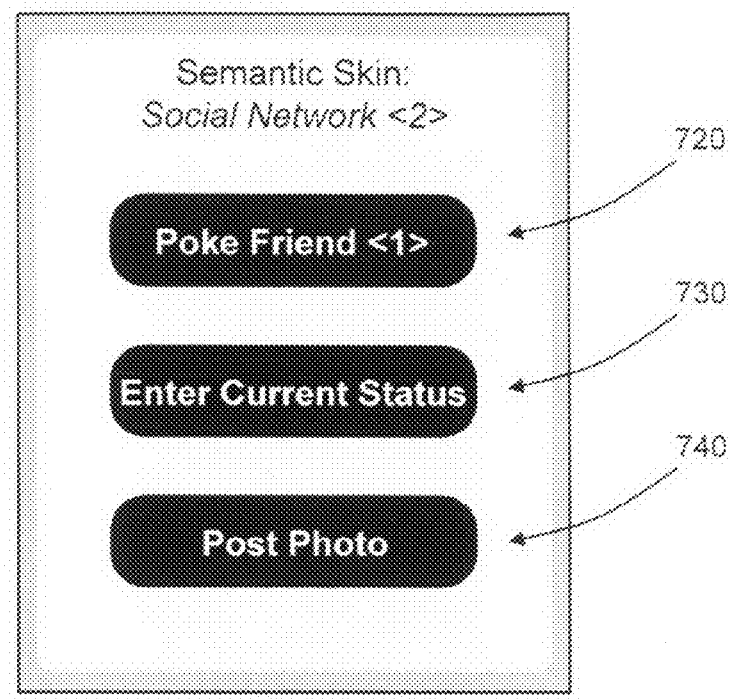
FIGS. 7A-B show examples of semantic skin user interfaces corresponding to services according to an embodiment of the invention.
Figure 7B:
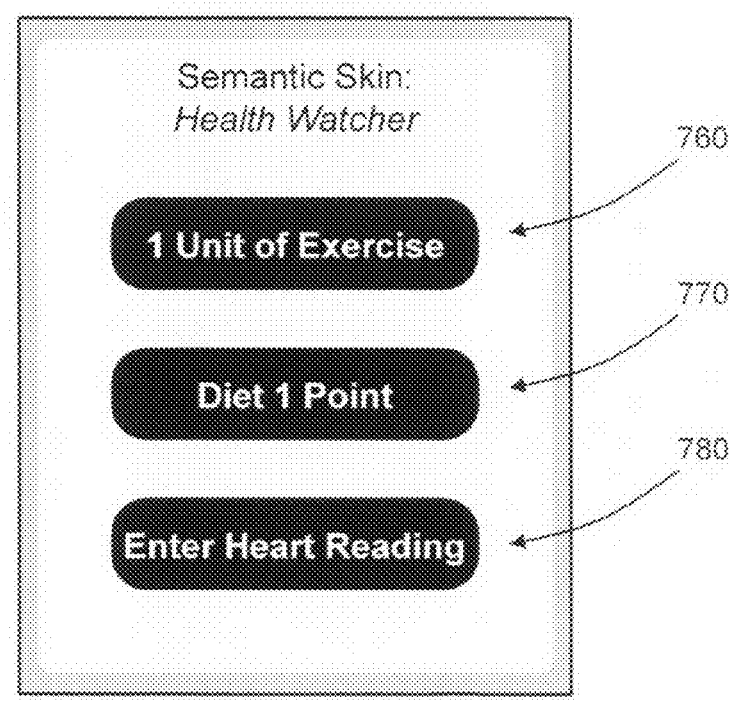

FIG. 7A shows an example of a semantic skin 710 for a social network service and FIG. 7B shows an example of a semantic skin 750 for a health or diet application. The semantic skin 710 includes a button 720 to "poke" a friend of the user in the social network, a button 730 to submit the current status of the user, and a button 740 to post a photo to the social network. The semantic skin 750 in the example shown by FIG. 7B includes a button 760 to enter exercise activity, a button 770 to enter diet information, and a button 780 to measure medical readings. The semantic skins can rely on context traits derived from the device where the data entry is performed. For example, the button 730 of semantic skin 710 can utilize the current location of the user as measured by the user device and publish that location to the social network. In another example, a user is operating a device that includes a heart monitor and the button 780 extracts heart rate measurements, attaches the measurements to a note, and communicates the note to a health service.

In a preferred embodiment, buttons in user interfaces and semantic skins are programmable. The buttons serve the purpose of providing simple or single click entry of data and minimizes the friction for a user to collect information and bind the information to services.

FIGS. 8-11 include details of a functional embodiment of the invention. The exemplary embodiment shown in FIGS. 8-11 are directed to social network services, such as Facebook.com and Twitter.com, though its extension to other services can be appreciated by one of ordinary skill in the art. The invention is not limited to the embodiment of FIGS. 8-11;

alternatives to the services and applications described in FIGS. 8-11 can be identified by one of ordinary skill in the art.

Figure 8:
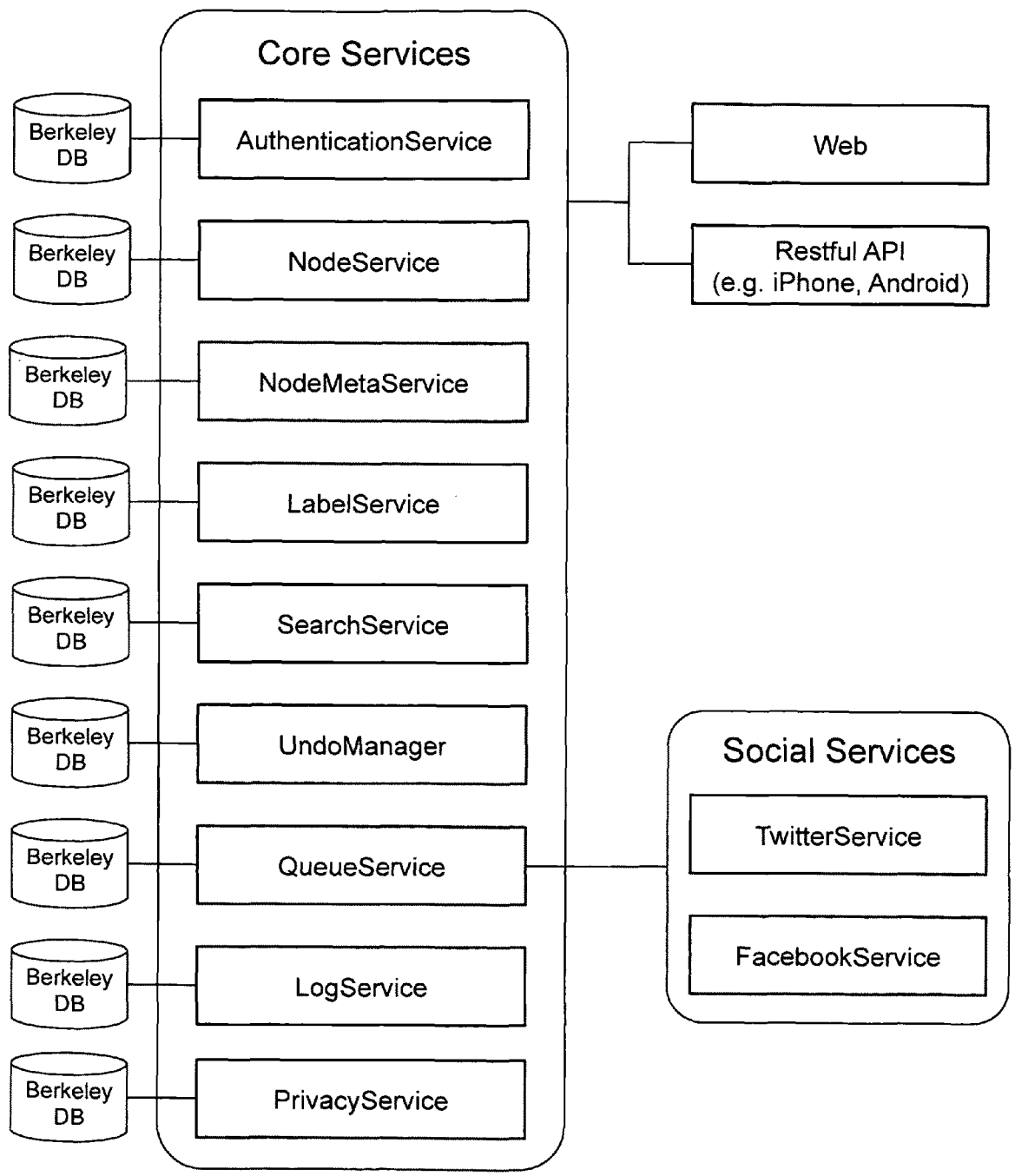
FIG. 8 shows the core services of an exemplary embodiment of the invention.
Figure 9:
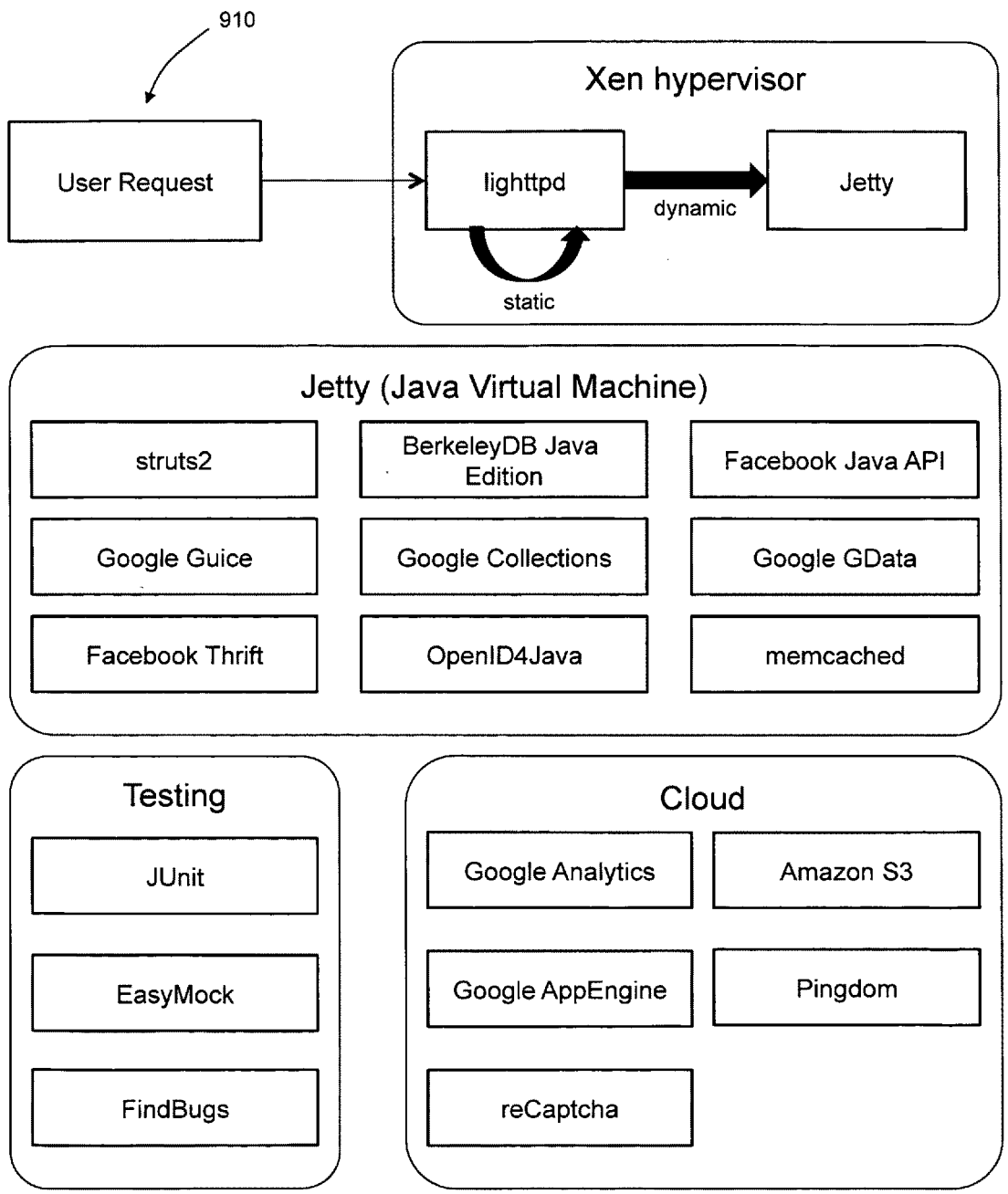
FIG. 9 shows the technology services underlying the core services shown in FIG. 8 according to an embodiment of the invention.

FIGS. 8-9 show the technologies used by the application server in an exemplary embodiment of the invention. The core services are shown by FIG. 8 and include the AuthenticationService, NodeService, NodeMetaService, LabelService, SearchService, UndoManager, QueueService, LogService, and PrivacyService. Each of the core services has its own instance of a BerkeleyDB Java Edition as a backing store. FIG. 9 shows an initial user request 910 that is handled by a web server, e.g. lighttpd. Lighttpd serves up all the static content. If the request is for dynamic content then it is forwarded to the Jetty Java Application Server. Jetty runs inside of the Java Virtual Machine. In the embodiment shown in FIG. 9, the struts2 web framework is used inside of Jetty. Struts2 determines which services are needed to fulfill the request and uses Google Guice to create all the objects needed by the user. After all the objects have been created, struts2 fulfills the users request and generates the page. The jQuery JavaScript library is used to speed up and simplify cross-platform development. Google collections Library is used to augment the standard Java collections.

Figure 10:
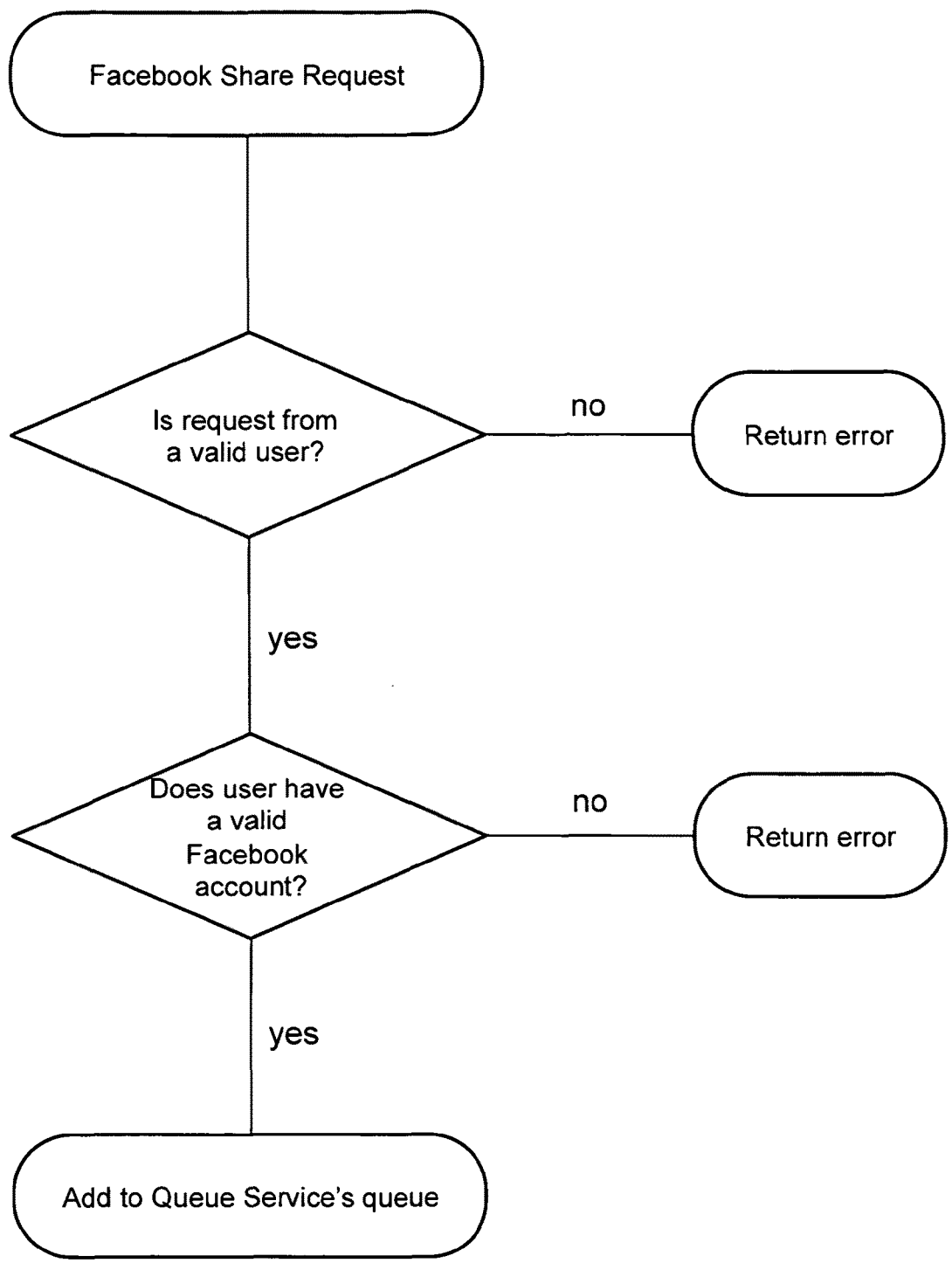
FIG. 10 shows a flow chart of an example login and authentication function in an exemplary embodiment of the invention.

FIG. 10 shows a flow chart related to the AuthenticationService of an exemplary embodiment of the invention. The AuthenticationService allows a user to communicate with any service that requires authentication or login information; thereby the semantic note taking system can be integrated with any number of third party applications and services. In the example shown in FIG. 10, a user request to share a note on Facebook is shown. The request is handled by struts2, which checks if the user is a valid user of the semantic note taking system. If the request is from a valid user, a request is sent to the FacebookService to verify if the user has valid Facebook credentials. If the user has a valid Facebook account, the request is sent to the QueueService to en-queue the Facebook share request.

Figure 11:
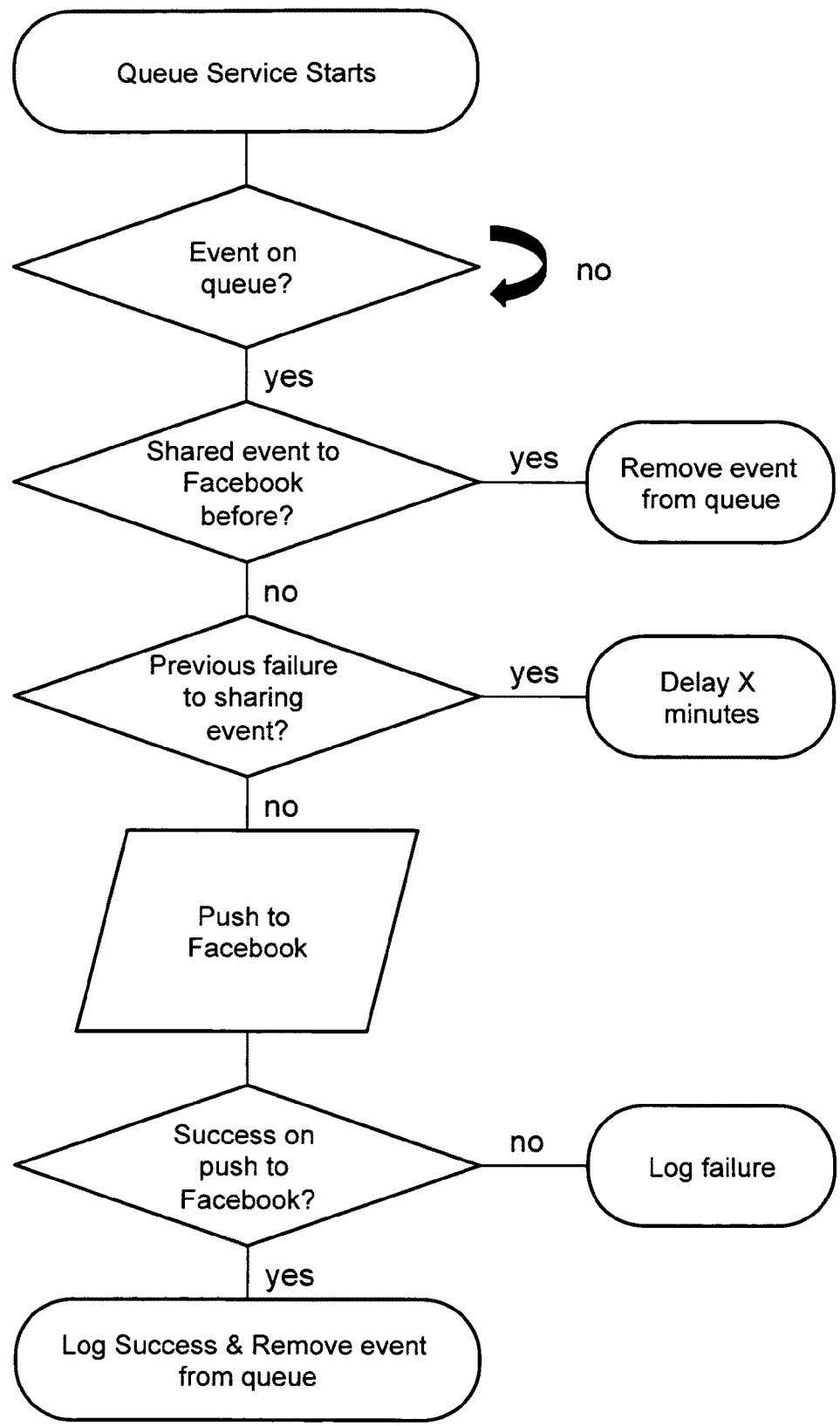
FIG. 11 shows a flow chart of an example Queue service in an exemplary embodiment of the invention.

FIG. 11 shows a flow chart related to an embodiment of the Queue Service. When an event is en-queued in the QueueService's queue, the QueueService checks if the note associated with that event has been previously shared to Facebook. The LogService tracks when a note has been successfully shared to Facebook. If the note has been previously successfully shared, it is removed from the queue. The QueueService then checks if there was a problem sharing the note. If the note has had a failure, the share event is timed out and put back in the queue to be run after X minutes. The note is then pushed to the user's Facebook account. The note is pushed by the QueueService calling the FacebookService to fulfill the share request. If the request succeeds, the event is removed from the QueueService's queue and logged to LogService.

EXAMPLES

The following examples demonstrate exemplary applications for the embodiments of the invention. It is noted that applications for the invention are not limited by these examples; other applications of the invention can be identified by one of ordinary skill in the art.

Example 1

Product Review

A user enjoys a product, such as a glass of wine. During a dinner engagement The user jots down information related to the wine, such as the brand, vintage, variety, etc., by accessing a user interface to the semantic note taking system. The note includes a label of "#wine" for future reference to the note. Context traits, including the GPS coordinates where the note was created is associated with the note. Using the GPS coordinates and accessing a directory information module, the name of the restaurant is derived and automatically associated with the note. The note is saved in the database.

At a later date, the user chooses to discuss the wine with friends of the user who may be wine enthusiasts. By binding the wine review note to a social network or an email application, the note is communicated to one or more friends of the user. One of the friends writes a brief review of the wine and attaches that review to the note. After the note has been shared to friends of the user, the user decides to write a wine review to be posted on a wine website. The user refines the note and binds it to the wine review website to be published to the world.

Example 2

Retail

Figure 12A:
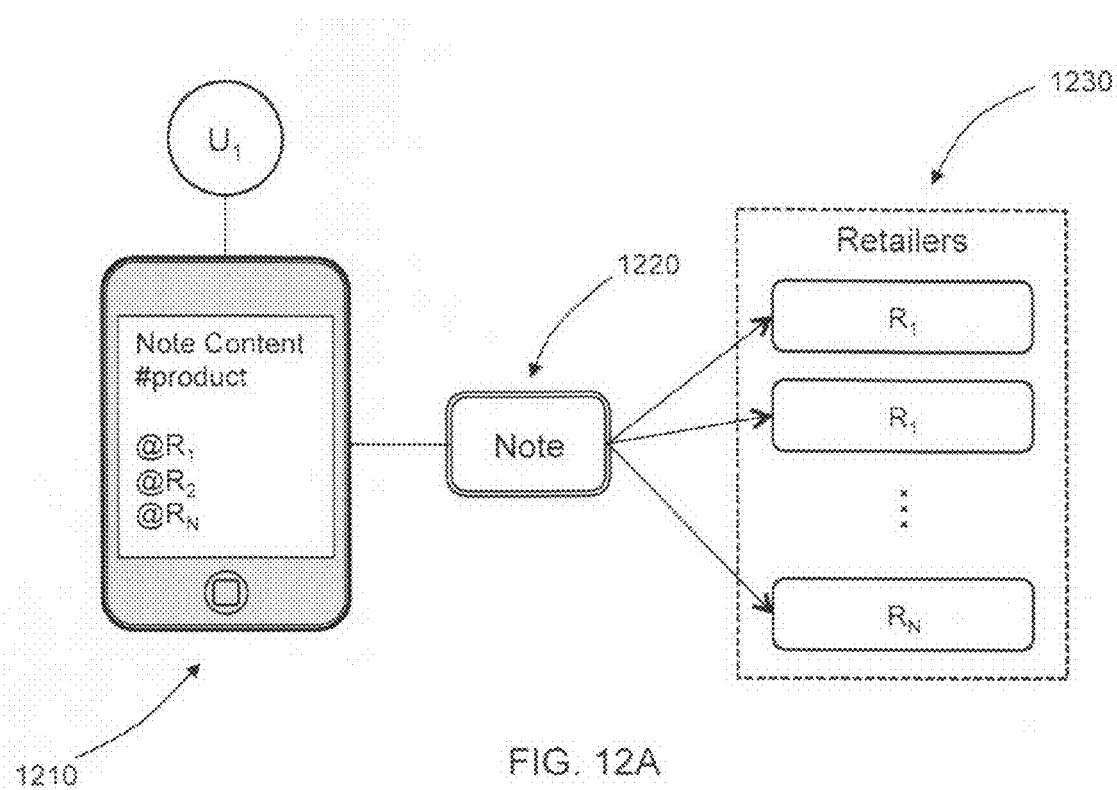
FIG. 12 shows an example of using semantic note taking with online retailers according to an embodiment of the invention.
Figure 12B:
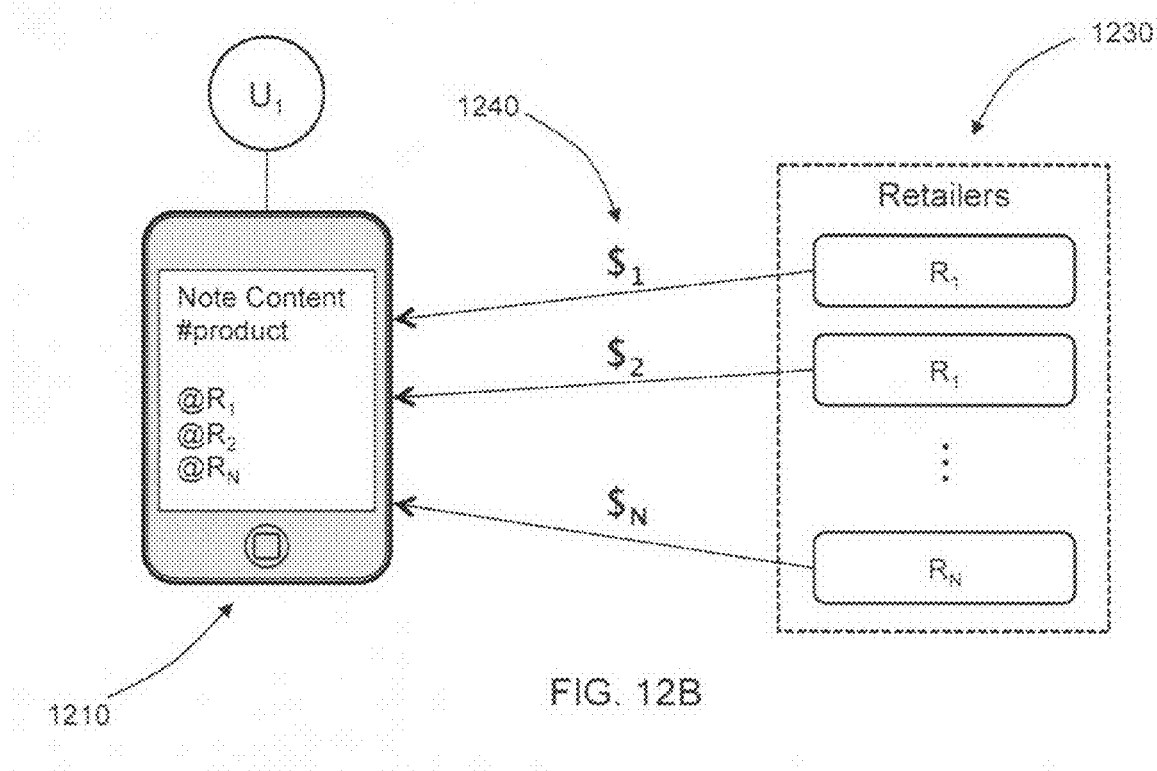

FIGS. 12A-B show an example of a retail application with bidding from multiple online retailers 1230. In FIG. 12A, user $U_1$ creates a note 1220 on a user device 1210. The note 1220 includes an identification of a product and binding rules that indicate it is to be bound to retailers $R_1$, $R_2$, and $R_N$. The note 1220 is communicated to the retailers $R_1$, $R_2$, and $R_N$ based on the binding rules. After the note 1220 is received by the retailers $R_1$, $R_2$, and $R_N$, the retailers send offers 1240 to user $U_1$ for the product described in the note 1220. Alternatively or additionally, the retailers $R_1$, $R_2$, and $R_N$ can send advertisements, coupons, or any information relating to the product to the user $U_1$.

Example 3

Health

Embodiment of the invention can be directed to a dietary, health, or medical service. For example, with minimal friction, a user can submit his or her dietary behavior to be tracked by a diet service. In another example, medical information can be collected at a hospital visit or doctor's appointment and submitted to an electronic medical record (EMR) application.

Example 4

Research

The semantic note taking system can also be applied to a research study. In an embodiment of the invention, research data is collected in a note. The research data can be collected from the field via a mobile device. The research data is enriched with time and location context traits. For repetitive data collection, a semantic skin would provide simple one click user entry of data. For example, embodiments of the invention can facilitate frictionless data gathering from door-to-door surveys. A door-to-door surveyor would need not enter the address of each participant of the survey as location context traits would be automatically associated with the note. Relevant data (e.g. resident names and demographics) can be automatically accessed based on the location context traits.

Semantic Note Enriching Through Search

Figure 13:
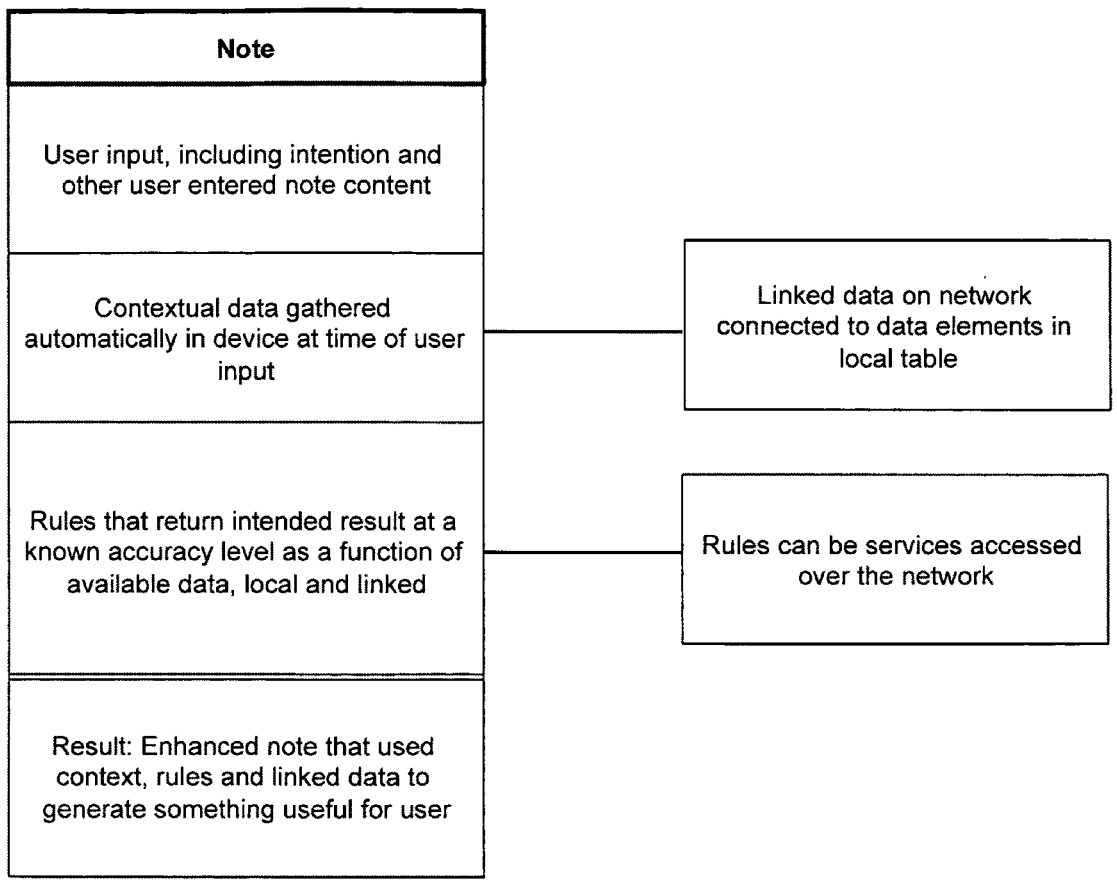
FIG. 13 shows an example of contextual data that can be used to bind a note to rules and linked data to enhance/enrich the value of the note to the user based on a user intention according to an embodiment of the invention.
Figure 14:
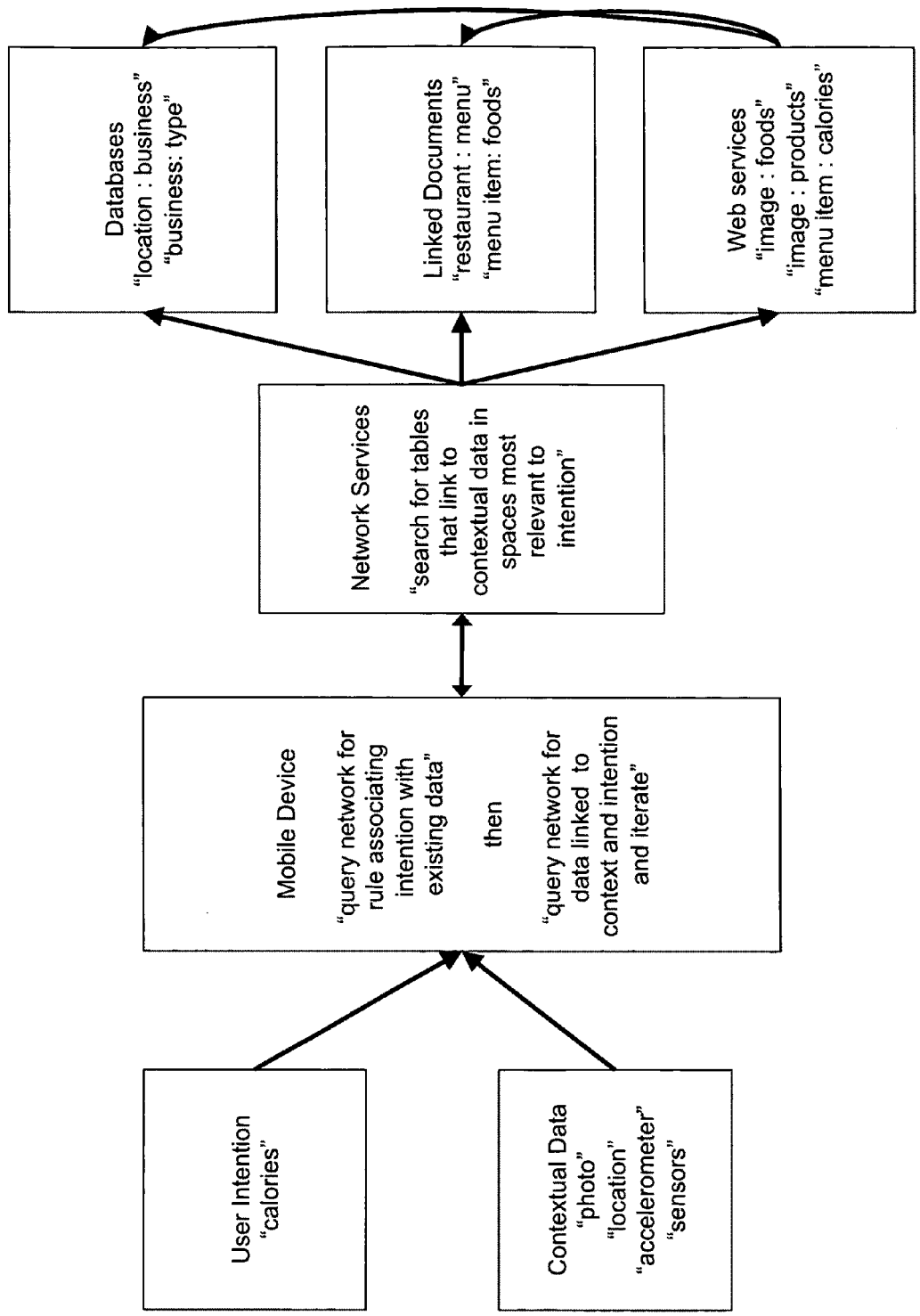
FIG. 14 shows an example of semantic note enriching using network services according to an embodiment of the invention.
Figure 15:
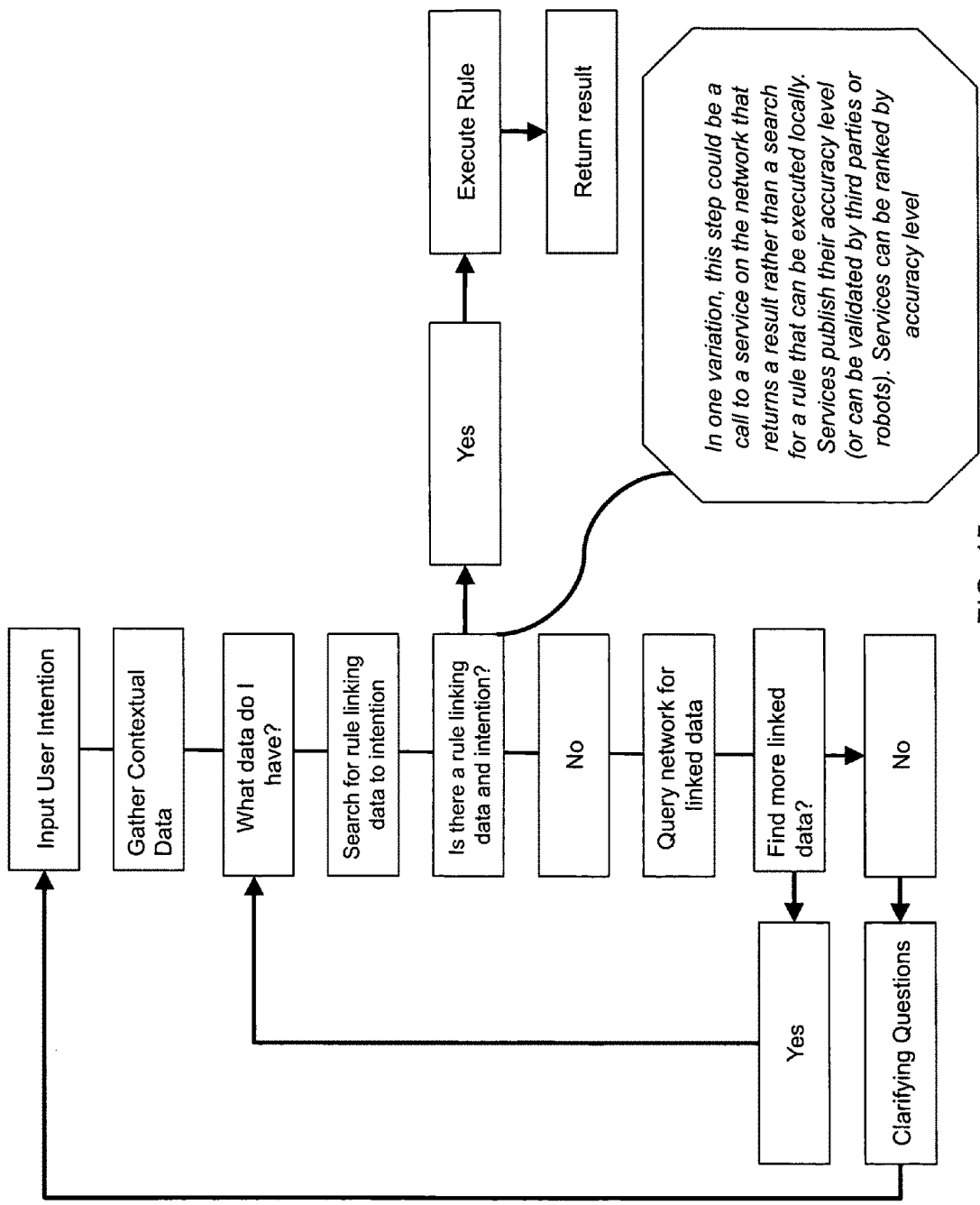
FIG. 15 shows a flow chart of semantic note enriching using search queries according to an embodiment of the invention.
Figure 16:
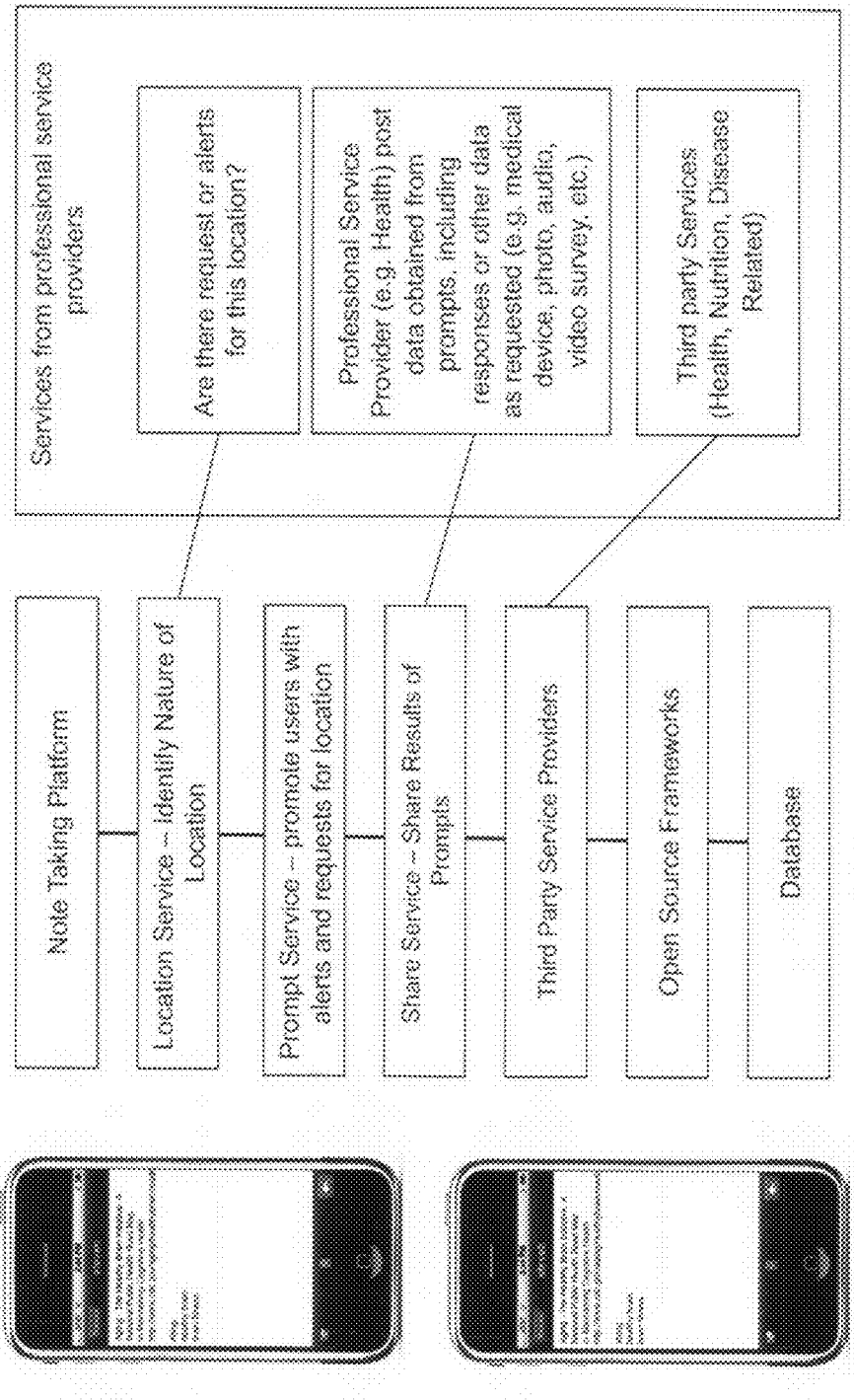
FIG. 16 show a flow chart of a context-aware prompt and alert system according to an embodiment of the invention.

The following description relates to semantic note enriching using web or network queries (FIGS. 13-15). One or more user intentions are associated with one or more local contextual data. This association of intention(s) and local contextual data is then used to query the web or network for intelligent and accurate results. The accuracy level or confidence level of the results could either be provided by the service or could be determined in a separate system independent from the service (s). The query will iterate until the accuracy or confidence level of the result matches the accuracy levels of the user, rather than ending the query with a result with a statistically determined relevance. The semantic note enriching could be a computer-implemented method or system operable on a (mobile) computing device in conjunction with a network of networks.

EXAMPLES

The following examples demonstrate exemplary applications for the embodiments of the invention. It is noted that applications for the invention are not limited by these examples; other applications of the invention can be identified by one of ordinary skill in the art.

Example 1

Exercise

The intention of the user is "Calories burned". The input from the user to a computer or mobile device can be a start and stop time during a physical exercise. The contextual data from the device that can be associated with the user's intent and input is for example a GPS trace, an accelerometer trace, a user identity, or data from a heart rate monitor, a blood pressure device, a temperature sensor, or the like.

A search query for rules (or functions) associating calories is performed with data that is currently available. An example of a search for a rule could be that if the intention is to know calories burned and the data one has is a gps trace, the search query could then be for calories burned rules. An example of a result of the (computer or web) query for that rule could be: http://walking.about.com/library/cal/uccalcl.htm where calories=function (miles, exercise type, weight).

Now assume that no rule exist and that all rules with required accuracy level require elevations and weight, some require basal metabolic rate or heart rate. Then a search is performed for linked data to [time, GPS trace, accelerometer trace, user identity]. Linked data to the GPS trace may be elevations, linked data to time and location may be weather data, linked data to an accelerometer trace may be step counting web service, and linked data to user identity may be health data including weight and basal metabolic rate.

In other words, if there is no rule that is calories=function (gps trace) then one needs to find a way to translate gps trace into miles. One also needs to find a way to translate accelerometer and or gyro into exercise type, and also needs to query the user profile to find weight before one can use the function for calories burned. So in effect one could have:
calories burned={function (function (gps trace), function (accelerometer trace), function (username))}.

After the search for linked data has been performed, a new data set is available and could include elevations trace, temperature, step count, and weight etc. We can now re-run the rule and produce a result. The result is that we use as the user intention and contextual association data to feed rules, and we can search network services for linked data, so that we have enough data to return an accurate and useful result.

This example works for wide variety of intentions. For example, user's intentions could relate to time, distance, exercise logging, competing with other people, speed, cardio effect, fat burned, etc. Intentions also can include medical intentions like cardiac rehabilitation, stress management, weight loss, diabetes. Each intention can be associated with rules that are able to return a result with the data on hand at an accuracy level. If the user wants more accuracy, more data may be needed.

Each device has a method to access rules and services (i.e. services that others can build). Data can be enriched, something that could be done with even one-click on a user's device (e.g. a mobile device).

Example 2

Diet

The intention of the user is "Calories consumed". The input from the user to a computer or mobile device could be a button press that logs #food tag and photo image. The contextual data from the device that can be associated with the user's intention is for example location, user identity, and optionally blood glucose and blood pressure.

A search query for rules associating calories is performed with data that is currently available. Now assume that no rule exist, because all rules with the user's required accuracy require specific menu items and portion sizes. Then a search is performed for linked data. Linked data to location could include business name, address, business type. Business name and type could link to a restaurant website. The restaurant website could have a posted menu, and the menu items use a microformat that includes food type and portion size. Food types and portion sizes could link to calories in publicly available databases.

Linked services to the photo image in the context of food could include automated web services that identify packaged goods from the package or bar code. Other services could analyze the photo image of a plate of food and tag the plate with food item labels. These services can be automated or through services like Amazon Mechanical Turk, in which image recognition tasks are delegated to people who tag the images. Image services could return a food name list.

In the next iteration of queries to the network services, links between the specific restaurant menu and food names can be found because of the semantic formatting of the menu on the specific restaurant's website.

In the next iteration, after food items and portion sizes have been determined, a direct result of calories can be returned. An example of a "not enough data" clarification question can be for a service that wants to know whether you finished your meal.

Other intentions that could link to data and services with the same initial data set of a food photo include: How many WeightWatchers Points? What is the carbon footprint of my meal? Nutritional content? Carbs versus protein versus fat? Eating local? Cost? How much exercise to burn off? How much insulin should I take?

Each of these intention rules have their own data requirements and accuracy levels. The process needs to be iterated until linked data is identified that fills the rule requirement. If none is found then the system can ask the user clarifying questions to enable the rule or another rule, or step down the accuracy level.

In another embodiment of the invention, the note taking system is used as a context aware prompt and alert system. For example a caregiver, who could be assisted by decision support tools, assigns alerts and prompts to a patient. The patient location (example of contextual trait) is registered in a system by patient registration address (for homebound and assisted living), by family members, or by patient location aware device. Alerts and prompts are tagged to location. Family and friends registered in the system could also report their location. Family and friend application cross references current location with prompts and alerts, receiving notices from server based on current location. Family and friends could respond to prompts by answering questions, taking notes, or performing other requested actions like taking blood pressure, blood glucose levels, weight, pulse oxygen, respiratory or other measurements, taking a photo or video of patient or symptom area, or audio of respiratory, heart, voice interview. Data is posted to patient record. The caregiver viewing the response to prompts can check off or update prompts based on the response. The professional user could also enter location-based prompts or alerts. The consumer user with the application running could receive prompts based on proximity to location. Consumer responses could also be recorded in the database. Professional users could also update the prompts and may aggregate data from many consumers.

In yet another embodiment, the context aware prompt and alert system could be applied to scuba diving. Coral reefs are under threat and ocean ecosystems are changing rapidly. Millions of people scuba dive every year and keep detailed logbooks of their dives. This data is rarely shared. A marine researcher studying the change in marine ecosystem with change in climate could post location, depth, temperature, time, date, or other context-based prompts. Divers using the note-taking system would receive these prompts based on context. For example, did you see any of species X? Did the reef at 100 feet look healthy or not?

Prompts can obtain multimedia—as in did you see anything that looked like this? Or, choose the photo that most resembles the state of the reef that you saw. Contextual data can be logged electronically, like depth, temperature, time, date, location, or can be reported manually. Data can be aggregated and analyzed by the researcher who can update queries.

In yet another embodiment, the context aware prompt and alert system could be applied to patient diary in a clinical trial with context-based prompts for specific or additional data. Examples of application are public health surveillance, either pandemic or bioterrorism threat, any public safety or homeland security issue where surveying many people based on context could be valuable, market research with context-based prompts or surveys. Chronic care management services alerting and prompting patients based on contextual data, mental health services, energy related services providing cues and questions based on energy consumption-related cues. For example, when you are in your car or park your car, the context-aware prompt could be about when you need to drive your car again. Cues could also be related to home energy consumption meters and from smart appliances.

Variations to the embodiments could be that location-based prompts can be pushed to device via SMS, email, phone call, voice mail, or video message. Device only needs to report location but does not need response mechanism built into app in this case. It can be an SMS query response. Context that triggers prompt or alert can be more than just location. For example, rule could be location, temperature, speed, altitude, activity, compass direction. Context also can be based on an activity. For example, every time the camera is used. Any mix of contextual cues can be used to trigger the prompt. It also can be done without location—just based on other factors. Contextual data can be from onboard sensors on smartphone, such as vibration, location, motion, rhythm, direction, gyro data, or can be from third party devices that communicate with smartphone by cable or bluetooth connection, including medical devices like blood pressure, blood glucose, pulse oxygen, respiratory measures, sleep measures, weight, and data from pill dispensing devices or drug delivery devices like insulin pumps, smart medication patches, home oxygen devices, home infusion devices, dialysis devices. Also data can come from exercise equipment, vehicles, or smart home devices including electrical appliances.

As one of ordinary skill in the art will appreciate, various changes, substitutions, and alterations could be made or otherwise implemented without departing from the principles of the invention, e.g. notes can be communicated to any service capable of being connected to the network, and any network, such as a WAN or LAN, can be used in addition to or in replacement of the Internet. Services and/or functions are computer-implemented either as stand alone units or part of one of more software/hardware packages. Accordingly, the scope of the invention should be determined by the following claims and their legal equivalents.

What is claimed is:

1. A method for providing context aware prompts and alerts in a note taking system, the method comprising:
   (a) providing a note taking function to allow a user to create a note on a user device, wherein the note is stored;
   (b) enriching the note by associating a local contextual trait with the note, wherein the local contextual trait is automatically gathered at the user device while the user creates the note on the user device;
   (c) providing a binding function to establish one or more binding rules for the note, wherein the binding rules determine one or more services where the note is to be bound, and wherein the binding rules are changeable;
   (d) assigning one or more prompts or alerts to the note using a prompt and alert service, wherein the assigning comprises assigning the local contextual trait associated with the note to the one or more prompts or alerts;
   (e) providing a registering function to allow one or more people to join the prompt and alert service, wherein the registering comprises defining one or more of the contextual traits for receiving a prompt or alert; and
   (f) the one or more people receiving one or more of the prompts or alerts based on one or more of the defined and registered contextual traits.

2. The method as set forth in claim 1, wherein the note comprises text, audio media, visual media, audio-visual media, recorded data, a weblink, a pointer to an information source, or any combination thereof.

3. The method as set forth in claim 1, further comprising the one or more other people further associating the local contextual trait with the note.

4. The method as set forth in claim 1, further comprising third party service providers associating the local contextual trait with the note.

5. The method as set forth in claim 1, wherein the user is a professional service provider.

6. The method as set forth in claim 1, further comprising a sharing function to share a response to the alert or prompt.

7. A computer system for providing context aware prompts and alerts, the computer system comprising:
   an application computer server, wherein a plurality of users are communicatively connected to the application computer server to create one or more notes, and wherein a plurality of services are communicatively connected to the application computer server; and
   a computer database for storing the notes created by the users, wherein the application computer server operates a plurality of functions each executable by the computer server, the functions comprising:

(a) a note taking function for allowing each of the users to create one or more of the note, wherein each of the notes comprises text, audio media, visual media, audio-visual media, recorded data, a weblink, a pointer to an information source, or any combination thereof;

(b) note enriching function for enriching the note by associating a local contextual trait with the note, wherein the local contextual trait is automatically gathered at the user device while the user creates the note on the user device;

(c) binding function for establishing one or more binding rules for the note, wherein the binding rules determine one or more of the plurality of services where the note is to be bound, and wherein the binding rules are changeable;

(d) a prompt or alert assigning function for assigning prompts or alerts to the note, wherein the assigning function comprises assigning the local contextual trait associated with the note to the one or more prompts or alerts;

(e) a registering function for allowing users to register to prompts or alerts assigned to the note, wherein the registering comprises a defining function to define one or more of the contextual traits for receiving the prompt or alert; and (f) a receiving function for receiving prompts or alerts based on the defined and registered contextual traits.

8. The system as set forth in claim 7, wherein the functions operated by the application computer server comprises a login function, wherein the login function provides login information for one of the users to one of the services, and wherein the login information is provided when one of the notes of the same of the users is bound to the same of the services.

9. The system as set forth in claim 7, wherein at least one of the users is a professional service provider.

10. The system as set forth in claim 7, further comprising a sharing function for sharing responses to alerts or prompts.

* * * * *